2 Sheets--Sheet 1.

B. D. WHITNEY.

Machines for Sawing Staves.

No. 5,856. Reissued April 28, 1874.

*Witnesses.*

D. P. Cowl

Edmund Masson

*Inventor.*

Baxter D. Whitney.

By atty. A. B. Stoughton.

AM. PHOTO-LITHOGRAPHIC Co. N. Y. (OSBORNE'S PROCESS.)

2 Sheets--Sheet 2.

B. D. WHITNEY.

Machines for Sawing Staves.

No. 5,856. Reissued April 28, 1874.

Witnesses.

D R Cowl

Edmund Masson

Inventor.

Baxter D. Whitney

By atty. A. B. Stoughton.

AM. PHOTO-LITHOGRAPHIC Co. N. Y. (OSBORNE'S PROCESS.)

UNITED STATES PATENT OFFICE.

BAXTER D. WHITNEY, OF WINCHENDON, MASSACHUSETTS.

IMPROVEMENT IN MACHINES FOR SAWING STAVES.

Specification forming part of Letters Patent No. 126,603, dated May 7, 1872; reissue No. 5,856, dated April 28, 1874; application filed February 21, 1874.

*To all whom it may concern:*

Be it known that I, BAXTER D. WHITNEY, of Winchendon, in the county of Worcester and State of Massachusetts, have invented certain Improvements in Machines for Sawing Staves; and I do hereby declare the following to be a full, clear, and exact description of the same, reference being had to the accompanying drawings making a part of this specification, in which—

Figure 1:
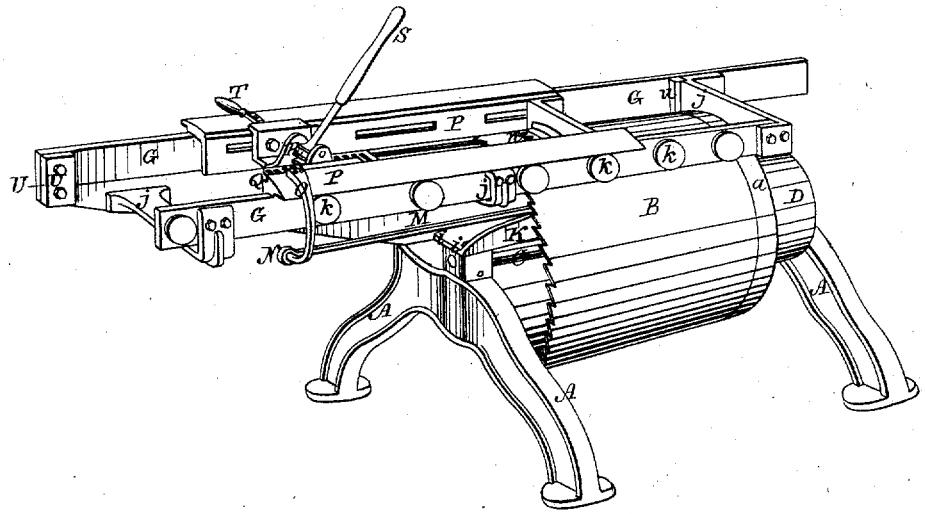
Figure 2:
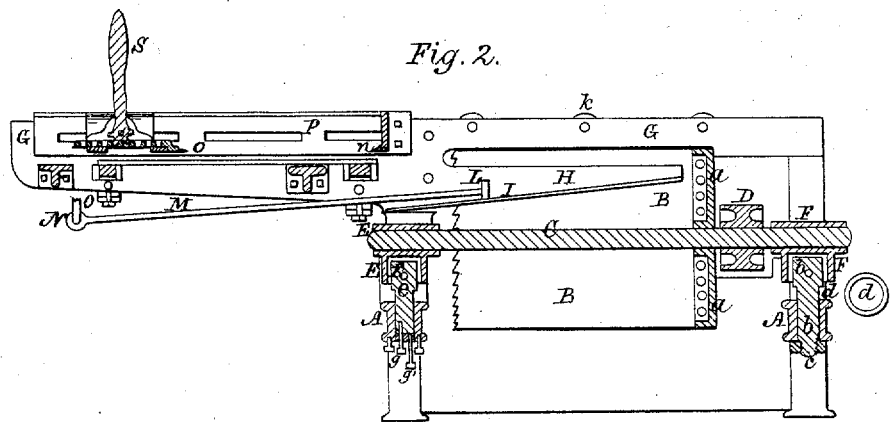
Figure 3:
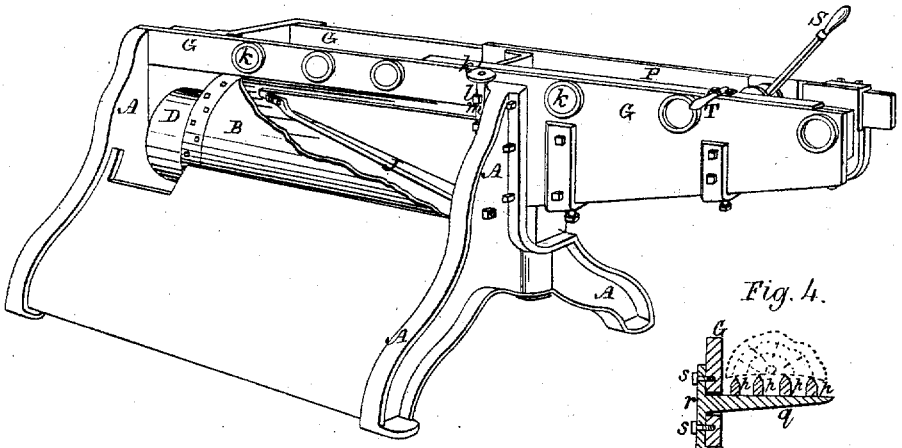
Figure 4:
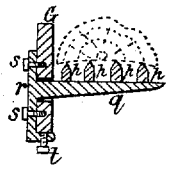
Figure 5:
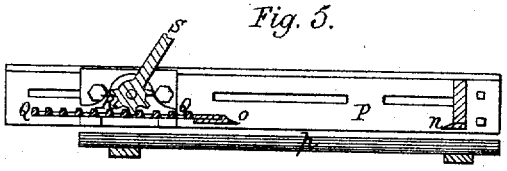
Figure 7:
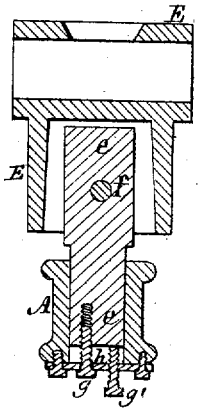
Figure 6:
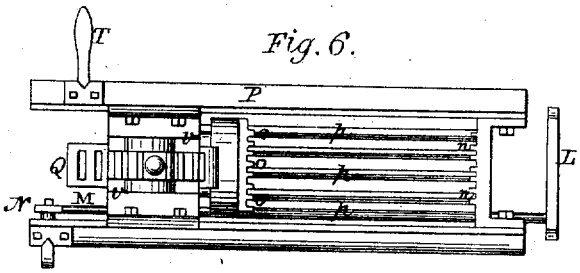

Figure 1 represents a perspective view of the machine. Fig. 2 represents a vertical longitudinal section through the same. Fig. 3 is a perspective view of the machine with a portion of the cylinder-saw represented as broken away to show the stave-trough within it. Fig. 4 is a transverse section through a portion of the machine, showing one of the way-pieces and the guide-bars upon which the block drops and rests, as also the means of adjusting the guide-bars. Fig. 5 is a longitudinal section, showing the feeding-carriage and its adjuncts. Fig. 6 is a plan of the feeding-carriage. Fig. 7 is a section, showing the housings which support the saw-arbor.

My invention relates to a machine for sawing staves of uniform thickness and curvature by means of a cylinder-saw, over which a carriage is traversed that carries the block or wood from which the staves are to be cut, said block of wood being alternately dogged to the carriage and dropped therefrom upon guides to regulate and make uniform the thickness and curvature of the staves, as will be hereinafter described.

The frame to which all the parts of the machine are attached is shown at A. B is a cylinder-saw running on an arbor, C. This arbor C carries a strong head, *n*, to which the cylinder-saw plate is firmly secured, whereby it is made rigid and capable of retaining a perfectly cylindrical form while sawing staves, and upon this arbor C is attached the driving-pulley D. The saw-arbor C runs upon the housings E F, which are arranged, as shown in the drawing, so that they may adjust themselves to the arbor. The housing or box F is hung on a swivel, *b*, which passes down through the frame A and terminates in a screw, *c*, upon which a screw-nut acts. Washers *d* may be inserted between the shoulder of the swivel *b* and the upper part of the frame A, so that the height of the housing F may be varied. The housing E at the other end of the arbor C is adjusted in a different way. The upper part of E is hung upon the standard *e*, and made fast to it by a pin, *f*, Fig. 7. This standard *e* passes nearly through the frame A, and is held in position vertically by the screws *g g'*, which pass through the plate *h*, that is made fast to the frame A by screws, as shown. The screw *g* passes up into the standard *e*, so as to hold it down at any desired position, while the screw *g'* screws through the plate and against the under side of the standard, so as to react against the tendency of the screw *g*. By these screws *g g'* the standard *e* may be adjusted to any desired position. The way-plates G are attached to the frame A by bolts. H is a prolongation of the way-plates, which passes into the interior of the cylinder-saw B, and forms one side of the stave-trough L, Figs. 1 and 2. This prolongation H is held rigidly in place by the brace J, Fig. 3. The other side of the stave-trough is formed by the piece K, Fig. 1. Upon the interior of the sides of the stave-trough, at the line of junction with the bottom of the trough, longitudinal channels *i i*, Fig. 1, are cast to serve as guides for the hoe or stave-remover L, Fig. 2. The hoe L is made to operate by the handle M, which is connected, by the eye-joint N, to the arm O, which is made fast to the carriage P, Fig. 1.

From the above it will be seen that the hoe moves with the carriage, so that at the time a stave is sawed and ready to drop into the trough the hoe is at the upper end of the trough, and as the carriage is drawn back will withdraw and bring the stave with it, the eye-hinge N allowing the hoe to follow the incline of the trough.

The way-bars G are connected by cross-pieces *j*, Fig. 1, and said bars are furnished with friction-rollers, *k*, for the carriage P to run upon. At *k'* there is a horizontal roller attached to a spring-bar, *l*, and so arranged that it may be adjusted by the screw *m*, so as to prevent the lateral motion of the carriage, which would otherwise take place from the pressure caused by the cut of the saw against the log or bolt while the sawing is taking place. The carriage P, upon which the log or bolt is made fast while being sawed consists of side pieces which run upon the friction-rolls *k* attached to the ways G G, and end pieces which tie the sides together, one of which end pieces—viz., that at the left of the Figs. 5, 6—is adjustable. Attached to one of these end pieces or braces are a series of points or spears, *n*, Figs. 1, 2, 5, and 6. Q, Figs. 5 and 6, is a sliding rack, at the end of which a series of points or spears, *o*, are made. R is a segment-gear operated by the lever S. Inspection of Figs. 2 and 5 will show that by simply moving the handle S the rack Q and spears *o* will advance or retreat, thus dogging the block close to the path of the saw for each stave in succession. To fasten the log or bolt into the carriage it is only necessary to place the log or bolt on the guide-bars *p p*, Figs. 5 and 6, and to force the spears *n* and *o* into its ends by a movement of the lever S, which action throws forward the rack Q and spears *o*, the pressure of the spears *o* upon the log or bolt serving to force the same against the spears *n* at the other end. The guide-bars *p* are attached to a base piece or arm, *q*, Fig. 4, which extends from a plate, *r*, which, in its turn, is made fast to the way-plate G by the screws *s t*. The screws *s* serve to clasp the plate *r* to the way-plate, while the screw *t* serves as an adjusting-gage to regulate the thickness of the staves, as required. T, Figs. 1, 3, and 6, is a handle attached to the carriage P, by which it is moved. *u* is a piece of rubber or some other elastic material attached to the way-piece G, to ease the stroke of the carriage in its forward motion. U is a piece of wood attached to the way-piece G, and serves as a stop to the carriage, while the inertia of the block disengages it from the teeth *n*, the handle S being raised, and the weight of the block sets it down to the guide-bars for each successive stave to be sawed. The guide-bars or supports *p p*, &c., on which the wood or bolt rests, are placed sufficiently near each other, that the smallest bolt will cover two of them, the object of the openings between them being to allow splints or bark from the bolts to fall through, so as not to be in the way of the bolt, and thus to cause the stave to be of unequal thickness. The housing E is made compact, as described, so as to allow of the saw being filed while in position. The rack Q is made with openings between the teeth, so that dirt, sawdust, &c., may not accumulate between them and obstruct the action of the segment-gear R. That part of the brace *v* upon which the rack Q rests is provided with openings to admit of the passage of dirt, sawdust, &c., as they fall from the openings in the rack.

I am aware that a ring or hoop saw has been used in combination with a dogging device and adjustable guide, as in patent No. 48,486, and I do not claim such combination as therein shown; but

What I claim as my invention is—

1. The carriage P, provided with the dogging devices *o n*, in combination with the frame A, having rollers *k* and saw B, all constructed as shown and described, and for the purpose set forth.

2. The combination of the cylinder-saw B, the adjustable guide-bars *p*, and the dogging-spears *o n*, arranged and operating to saw staves of a uniform curvature and thickness, substantially as described.

3. In combination with the carriage P, the arm O, and rod M, constructed as and for the purpose described.

BAXTER D. WHITNEY.

Witnesses:
GILES H. WHITNEY,
BENJAMIN R. DUY.